United States Patent
Popham et al.

(10) Patent No.: US 9,662,955 B2
(45) Date of Patent: May 30, 2017

(54) SUSPENSION CONTROL DEVICE

(75) Inventors: Thomas Popham, Coventry (GB); Anna Gaszczak, Coventry (GB)

(73) Assignee: Jaguar Land Rover Limited, Whitley, Coventry, Warwickshire (GB)

(*) Notice: Subject to any disclaimer, the term of this patent is extended or adjusted under 35 U.S.C. 154(b) by 0 days.

(21) Appl. No.: 14/343,289

(22) PCT Filed: Sep. 4, 2012

(86) PCT No.: PCT/EP2012/067236
§ 371 (c)(1),
(2), (4) Date: Apr. 11, 2014

(87) PCT Pub. No.: WO2013/034561
PCT Pub. Date: Mar. 14, 2013

(65) Prior Publication Data
US 2014/0222287 A1    Aug. 7, 2014

(30) Foreign Application Priority Data

Sep. 6, 2011 (GB) .................................. 1115398.8
Sep. 6, 2011 (GB) .................................. 1115400.2

(51) Int. Cl.
*B60G 17/0165* (2006.01)
*B60G 17/019* (2006.01)

(52) U.S. Cl.
CPC ....... *B60G 17/0165* (2013.01); *B60G 17/019* (2013.01); *B60G 2400/204* (2013.01); *B60G 2400/82* (2013.01); *B60G 2401/142* (2013.01); *B60G 2500/00* (2013.01)

(58) Field of Classification Search
CPC ............ B60G 17/0165; B60G 2400/82; B60G 2400/204; B60G 17/019; B60G 2401/142; B60G 2500/00
USPC .......................................................... 701/37
See application file for complete search history.

(56) References Cited

U.S. PATENT DOCUMENTS

| | | | | |
|---|---|---|---|---|
| 4,225,950 A | * | 9/1980 | Kotera et al. .................... 367/97 |
| 4,595,072 A | * | 6/1986 | Barnea ............................ 180/169 |
| 4,651,290 A | * | 3/1987 | Masaki et al. ................... 701/80 |
| 4,657,280 A | * | 4/1987 | Ohmori ...................... 280/5.515 |
| 4,674,767 A | * | 6/1987 | Kuroki et al. ............. 280/5.513 |
| 4,781,465 A | * | 11/1988 | Demachi et al. ............. 356/602 |
| 4,796,911 A | * | 1/1989 | Kuroki et al. ............. 280/5.511 |
| 5,041,977 A | * | 8/1991 | Kawabata ....................... 701/39 |

(Continued)

FOREIGN PATENT DOCUMENTS

DE   102007014358 A1   10/2008
DE   102010003544 A1   10/2011

(Continued)

OTHER PUBLICATIONS

Omashi et al., JP57-172808, Oct. 23, 1982 (Machine Translation).*

(Continued)

*Primary Examiner* — Courtney Heinle
(74) *Attorney, Agent, or Firm* — Reising Ethington P.C.

(57) ABSTRACT

A vehicle mounted time of flight camera provides repeating images of the scene ahead of a vehicle. Such images are processed to determine topographical features in the scene, and the vehicle suspension is commanded to adopt in advance a configuration appropriate to the nature of the topographical features.

19 Claims, 2 Drawing Sheets

(56) References Cited

U.S. PATENT DOCUMENTS

| | | | | |
|---|---|---|---|---|
| 5,061,932 A * | 10/1991 | Tribe et al. | | 342/70 |
| 5,076,384 A * | 12/1991 | Wada et al. | | 180/169 |
| 5,159,837 A * | 11/1992 | Wada | | 73/602 |
| 5,163,319 A * | 11/1992 | Spies et al. | | 73/146 |
| 5,347,457 A * | 9/1994 | Tanaka et al. | | 701/37 |
| 5,450,322 A * | 9/1995 | Tanaka et al. | | 701/37 |
| 5,497,325 A * | 3/1996 | Mine | | 701/38 |
| 5,696,515 A * | 12/1997 | Zyren et al. | | 342/104 |
| 5,817,936 A * | 10/1998 | Schricker | | 73/146 |
| 6,122,578 A * | 9/2000 | Knolle | | 701/37 |
| 6,219,600 B1 * | 4/2001 | Pochmuller | | 701/37 |
| 6,233,510 B1 * | 5/2001 | Platner et al. | | 701/37 |
| 6,452,684 B1 * | 9/2002 | Mennink | | 356/601 |
| 6,577,334 B1 * | 6/2003 | Kawai et al. | | 348/148 |
| 6,701,235 B2 * | 3/2004 | Uchiyama et al. | | 701/37 |
| 6,898,501 B2 * | 5/2005 | Schubert | | 701/50 |
| 8,788,146 B1 * | 7/2014 | Lu et al. | | 701/37 |
| 2003/0137673 A1 * | 7/2003 | Cox et al. | | 356/601 |
| 2003/0236603 A1 * | 12/2003 | Lu | | 701/37 |
| 2004/0055795 A1 * | 3/2004 | Kamen et al. | | 180/7.1 |
| 2004/0075737 A1 * | 4/2004 | Kirby | | 348/135 |
| 2004/0148057 A1 * | 7/2004 | Breed et al. | | 700/242 |
| 2006/0173596 A1 * | 8/2006 | Hohmann | | 701/38 |
| 2007/0100532 A1 * | 5/2007 | Miyajima et al. | | 701/95 |
| 2008/0091315 A1 * | 4/2008 | Krokel et al. | | 701/29 |
| 2008/0234900 A1 * | 9/2008 | Bennett | | 701/48 |
| 2008/0243334 A1 * | 10/2008 | Bujak et al. | | 701/37 |
| 2008/0314656 A1 * | 12/2008 | Brehob et al. | | 180/7.1 |
| 2009/0097038 A1 * | 4/2009 | Higgins-Luthman et al. | | 356/602 |
| 2010/0023211 A1 * | 1/2010 | Ammon et al. | | 701/37 |
| 2010/0042292 A1 * | 2/2010 | Schindler et al. | | 701/37 |
| 2010/0152969 A1 * | 6/2010 | Li et al. | | 701/37 |
| 2011/0026008 A1 * | 2/2011 | Gammenthaler | | 356/28 |
| 2011/0060502 A1 * | 3/2011 | Atz et al. | | 701/37 |
| 2011/0190972 A1 * | 8/2011 | Timmons et al. | | 701/29 |
| 2011/0196569 A1 * | 8/2011 | Lee et al. | | 701/29 |
| 2011/0215915 A1 * | 9/2011 | Lee et al. | | 340/435 |
| 2011/0307147 A1 * | 12/2011 | Bujak et al. | | 701/37 |
| 2013/0079990 A1 * | 3/2013 | Fritsch et al. | | 701/41 |
| 2013/0103259 A1 * | 4/2013 | Eng et al. | | 701/37 |
| 2013/0268145 A1 * | 10/2013 | Kamen et al. | | 701/2 |
| 2014/0188350 A1 * | 7/2014 | Popham et al. | | 701/49 |

FOREIGN PATENT DOCUMENTS

| | | |
|---|---|---|
| JP | S61-244614 A | 10/1986 |
| JP | H07-013515 U | 3/1995 |
| JP | H11-139133 A | 5/1999 |
| JP | 2005-088834 A | 4/2005 |
| JP | 2007-008404 A | 1/2007 |
| JP | 2007046949 A | 2/2007 |
| JP | 2008-090748 A | 4/2008 |

OTHER PUBLICATIONS

Combined Search and Examination Report for GB1115400.2, dated Jan. 4, 2012, 6 pages.
Examination Report under Section 18(3) for GB1115398.8, dated Oct. 28, 2011, 7 pages.
International Search Report for PCT/EP2012/067236, dated Jan. 24, 2013, 3 pages.
Written Opinion for PCT/EP2012/067236, dated Jan. 24, 2013, 4 pages.
Japanese Office Action dated Mar. 3, 2015, corresponding to Japanese Patent Application No. 2014-527698, with English Summary of Office Action.

* cited by examiner

SUSPENSION CONTROL DEVICE

TECHNICAL FIELD

This invention relates to a predictive system for control of vehicle suspension and particularly, but not exclusively, to such a system for a vehicle having off-road capability. Aspects of the invention relate to a system, to a vehicle and to a method.

BACKGROUND

Adjustable suspension systems of vehicles are known. One typical system provides ride-height adjustment so that, for example, a higher ride height may be available for off-highway travel. Several ride height settings may be provided, including for example a low setting for high-speed highway travel. Adjustable height suspension is generally selected manually by the vehicle driver, though a default setting may be provided at each engine start.

Another kind of adjustable suspension is adopted to vary damping and/or shock absorption to give a ride quality that can be characterized as hard or soft. Again, ride quality is generally selected manually by the driver.

A vehicle driver may not know if a particular vehicle is fitted with an adjustable suspension system, and even with such knowledge the driver may not know which of several suspension settings is appropriate for the terrain across which the vehicle is to travel. Some adjustable suspension systems are relatively complex, and it would be desirable to aid the driver in obtaining the best setting(s) for a given terrain.

One solution is to provide adaptive suspension whereby the vehicle is itself capable of adjusting suspension parameters according to conditions of use. Such systems may be relatively unsophisticated, and provide for example an increased ride height in response to repeated large displacements of the vehicle wheels relative to the vehicle body. Such systems cannot prepare the vehicle for a change in terrain, and thus an unaware driver may risk damage to a vehicle and/or injury to occupants in case of the sudden occurrence of an unapparent topographical feature.

A predictive system for suspension control is desirable whereby a vehicle suspension automatically adopts a configuration best suited to the terrain ahead of the vehicle.

SUMMARY

According to one aspect of the invention there is provided a vehicle suspension control system comprising a vehicle mounted time of flight camera system having a forward facing camera, the system being arranged to illuminate and repeatedly capture an image of the scene ahead of the vehicle, to identify topographical features in the scene, to identify the speed of the vehicle, and to automatically adjust suspension parameters of the vehicle according to the nature of said features and an expected speed of the vehicle when it reaches a feature.

Thus, for example, a scene in which a rocky terrain is identified allows the vehicle to adopt raised suspension of appropriate stiffness in advance of the rocky terrain being reached. The speed of the vehicle when it reaches the rocky terrain is also taken into account, and the suspension is adopted accordingly. For example, if the vehicle is likely to reach rocky terrain while moving at a high speed, the suspension may be raised to reduce the risk of collisions, while the dampening may be reduced to allow reduce the jolting experience by the driver and any passengers. At a lower speed, the suspension may still be raised by the same amount, but the dampening may be kept high to provide greater control. In this way the composure of the vehicle can be maintained, providing a smoother perceived driving experience for the driver. Automatically implemented settings which vary from a standard setting may be accompanied by an appropriate warning to the vehicle driver, for example in the form of a warning chime or a displayed message. Reversion to standard settings, or to a more extreme setting may be similarly notified.

The expected speed of the vehicle when it reaches a feature may be the speed identified as part of the method. Alternatively, the expected speed may be calculated based on the speed identified as part of the method. The expected speed may be calculated using known techniques based on one or more of the current speed of the vehicle, at least one previous speed of the vehicle, the state of the vehicle's engine and brakes, and the vehicle's attitude.

Known discrimination techniques are used to analyse the scene from repeated images according to pre-determined criteria. For example the size of projections above a ground plane may be filtered according to pre-determined size ranges, each size range being associated with a respective suspension height setting. In this simple example, the larger the projection, the larger the selected suspension height.

Information about the frequency and spacing of projections may permit further suspension adaptation according to the estimated roughness of the terrain ahead of the vehicle.

A vehicle speed sensor may allow further adaptation, for example to select the smoothest available ride setting appropriate to the roughness of the terrain at that speed.

Suspension settings are provided in any suitable manner, for example in a look-up table or the like of an electronic control unit containing a processor.

According to embodiments of the invention, optimal predictive setting of the suspension is obtained automatically, thus relieving the vehicle driver from a somewhat complex control task, and ensuring that an inexperienced driver can make best use of the vehicle capabilities.

Embodiments of the invention are suitable for both on-road and off-road driving. Thus on a smooth highway, the system will determine that the surface has low incidence of discontinuities and accordingly a relatively low suspension height may be accompanied by a relatively high rate of damping. A discontinuity in the road surface, for example a trench or hump may, according to the size and shape of the discontinuity, cause the suspension to momentarily adopt a higher ride height and softer suspension setting as the vehicle crosses the discontinuity.

Off-road, the system can discriminate between small and large deviations from a notional ground plane, and thus distinguish between a rocky track and a boulder field. Size discrimination may be of the order of 5 mm so that quite small variations in the size of a discontinuity can be mapped, and a prediction effected.

The foregoing description refers to projections above a ground plane. Imaging of the scene ahead of the vehicle may also allow the depth of topographical depressions to be determined, is that appropriate suspension parameters can be predicted before the depressions are reached. The higher the mounting of the forward facing camera the better will be the imaging of such depressions. Accordingly the camera is advantageously downward facing to some extent, and mounted at or around the height of the vehicle bonnet.

The ground plane can be interpolated by any suitable technique to provide a reference for topographical deviations and vehicle suspension height. For example, the RANSAC technique embodies a method of fitting a line or a plane to an array of data points that contain many outliers.

Where the depth of a depression cannot be determined or interpolated, the predictive system may automatically command a suitable suspension setting, such as maximum ride height.

A speed of travel off-road is typically low, less than 15 kph, and at such speeds the suspension system has time to react just before reaching a discontinuity. For an off-road application the area illuminated by the camera can thus be closer to the front of the vehicle than for highway driving, for example in the range 1-10 meters.

Repeating images from a time of flight camera system can give information about the gradient ahead of a vehicle. In conjunction with information about the current attitude of the vehicle, for example from an inclinometer or like device, the system can provide suspension adjustment information suitable for ensuring appropriate suspension setting during gradient changes. Thus for example when significantly changing gradient at low speed, for example when cresting a hill, the system can prepare a vehicle for a new gradient in advance, so that for example suspension height can be changed to give a suitable approach and departure angle for the vehicle According to another aspect of the invention there is provided a method of adjusting suspension parameters of a vehicle comprising the steps of:

illuminating the scene ahead of the vehicle, and repeatedly capturing an image thereof;
identifying topographical features in the repeating image;
determining the deviation of said features from a ground plane;
determining the speed of the vehicle; and
automatically adjusting suspension parameters of the vehicle in advance of said features in accordance with said deviation and an expected speed of the vehicle when it reaches a feature.

Embodiments of the invention may also be combined with other techniques of adapting a vehicle to variable terrain, including systems of estimating terrain type by mechanical measurement of, for example wheel slip, suspension travel vibration etc., and systems relying on camera based forward recognition of terrain type.

Within the scope of this application it is envisaged that the various aspects, embodiments, examples, features and alternatives set out in the preceding paragraphs, in the claims and/or in the following description and drawings may be taken independently or in any combination thereof. For example features described in connection with one embodiment are applicable to all embodiments, except where there is incompatibility of features.

It may be that the system is further configured to identify a point of interest in the repeating image and determine the speed of movement of the vehicle with respect of said point of interest.

The system may be further configured to identify a point of interest in the repeating image and determine with respect to said point of interest:

the speed of movement of the vehicle forward with respect to the scene; and
the speed of movement of the vehicle across the scene.

It may be that there is provided a system for a vehicle comprising a vehicle-mounted time of flight camera arrangement, the system being arranged to illuminate and repeatedly capture an image of the scene ahead of the vehicle and to use the image data to determine the speed of movement of the vehicle with respect to said image.

The system may identify a point of interest in the repeating image, and determine speed of movement of the vehicle with respect to the point of interest. Alternatively some other data analysis technique may be used, such as using the entire image data to estimate change in relative position and orientation using an iterated closest point algorithm.

Time of flight camera systems are known. Generally speaking the camera illuminates a scene with infra-red light. An imaging chip within the camera determines the time of flight of the infra red light to the scene and back to each pixel of the chip. Thus the image on the chip gives an instantaneous representation of the distance from the camera to topographical features in the scene, rather than an image constructed from line by line scanning.

Typically, the camera will refresh the image of the scene repeatedly, for example at a rate of 40 frames per second. A high refresh rate facilitates following a point of interest despite changes of viewing position due to attitude change of the vehicle, and changes in the separation distance.

In one embodiment the vehicle speed calculator includes a processor adapted to select a point of interest which appears to be moving in a straight line toward the vehicle. The point feature may be defined by a plurality of pixels of the imaging chip. The processor may select more than one point of interest so as to increase confidence in calculation of vehicle speed.

Relative movement of the point of interest and the vehicle need not be on the shortest line. Triangulation techniques permit relative motion in any desired direction to be determined. Relative speeds in relation to several points of interest provide comparison so as to give greater confidence in the calculated speed of the vehicle.

The vehicle speed calculator may select several points of interest to define a line feature, or several line features, and determine the speed of movement of the vehicle with respect to the or each line feature.

The vehicle speed calculator may select several points of interest to define a topographical array, or several such arrays, and determine the speed of movement of the vehicle with respect to the or each array. As noted above the entire image data may be used to estimate relative position, and thus speed.

Relative motion of the vehicle may not be forward with respect to the scene. For example a vehicle may slip sideways on a slope without making forward movement. The present invention allows such sideways motion to be analysed to give a relative speed across the scene. When taken together, the relative speed forward with respect to the scene and the relative speed across the scene can provide a velocity. Relative motion in all directions can be computed so as to determine movement in three mutually perpendicular directions of translation and in pitch, roll and yaw. These relative motions together provide a velocity. By calculating a velocity in three dimensions and the pitch, roll and yaw of the vehicle, a system according to the invention can provide a vehicle state estimation.

The processor may calculate vehicle speed at the refresh rate of the camera. However a lesser rate may be selected to save processor capacity, and because speed calculation at the refresh rate is not of practicable use. Repeated speed calculation at intervals of about 1 second may be sufficient.

In an embodiment the vehicle speed calculator identifies one or more points of interest in the near field and in the far field. The near and far fields may be defined in any suitable manner, for example the near field may comprise the scene within 10 meters of the camera, and the far field may comprise the scene beyond 10 meters.

The invention is particularly suitable as a means of providing low speed cruise control, so that the vehicle can maintain a steady speed off-road regardless of gradient.

Repeating images from a time of flight camera system can give information about the gradient ahead of a vehicle. In conjunction with information about the current attitude of the vehicle, for example from an inclinometer or like device, the system can provide speed adjustment information suitable for maintaining a pre-set cruise speed during attitude changes. Thus for example when significantly changing gradient at low speed, for example when cresting a hill, the system can prepare a vehicle engine for the new gradient in advance, thus overcoming the inherent delay between requesting a change of engine output, and delivery of the requested output. The vehicle can thereby better maintain a set speed in cruise control mode.

This technique allows handover from near field points of interest to far field points of interest as the near field points pass out of the field of view of the camera (typically beneath the vehicle).

Other suitable techniques may be used provided that a continual indication of vehicle speed is maintained by reference to points of interest within the imaged scene.

Identification of points of interest is by conventional pattern recognition techniques which form no part of the present invention. Such techniques can accommodate the relative increase in size of a point of interest in successive images, as the vehicle approaches the point of interest.

Pitching and rolling of the vehicle aids in providing three-dimensional information, so as to better allow selection and discrimination of points of interest. Such gross vehicle movement is very common in off-road driving, and the degree of such movement is generally inversely proportional to vehicle speed; thus the slower the vehicle, the more effective the system of the invention may be.

True speed of movement of the vehicle also provides data for determination of wheel traction information both on and off-road.

As noted above, counting techniques are not reliable for vehicle speed determination where wheel slip is a significant factor. Counting wheel revolutions can however be performed reliably, using for example techniques employed in anti-lock braking system.

It may be that there is provided a vehicle wheel slip calculator comprising the system of the previous aspect, a wheel rotation calculator to determine the theoretical speed of rotation of a vehicle wheel commensurate with the instant speed of the vehicle, a wheel speed indicator for indicating the instant speed of rotation of said wheel, and a comparator to continually compare said theoretical speed of rotation with said instant speed of rotation in order to determine instant wheel slip.

The wheel slip calculator may determine wheel slip for all wheels of the vehicle.

Such a device can give information concerning the time level of traction at the wheels, and thus allow other vehicle systems to be more effective. For example suspension and engine adjustments may be effected in order to for example gain ground clearance or increase engine output torque; an alternative transmission ratio may be engaged and other measures appropriate to improving vehicle traction.

This aspect of the invention overcomes prior wheel slip measurement techniques which tend to compare instant speed of rotation of several wheels in order to identify slip. Such systems cannot give absolute information if all of the compared wheels are slipping.

It may be that there is provided a method of vehicle speed calculation comprising the steps of illuminating the scene ahead of the vehicle, and repeatedly capturing an image thereof using a camera, and determining the speed of movement of the vehicle with respect to said image.

The speed of movement may be determined from the entire image data, using for example an iterated closest point algorithm, or by identifying one or more points of interest in the repeating image.

This aspect also provides a method of calculating wheel slip and comprising determining vehicle speed according to the second aspect of the invention, determining the theoretical speed of rotation of a vehicle wheel according to said determination of vehicle speed, measuring the actual speed of rotation of said vehicle wheel and determining the instant slip of said wheel.

The method is carried out continually for all wheels of the vehicle so as to obtain a substantially continuous indication of wheel slip.

Within the scope of this application it is envisaged that the various aspects, embodiments, examples, features and alternatives set out in the preceding paragraphs, in the claims and/or in the following description and drawings may be taken independently or in any combination thereof. For example features described in connection with one embodiment are applicable to all embodiments, except where there is incompatibility of features.

BRIEF DESCRIPTION OF THE DRAWINGS

Embodiments of the present invention will now be described, by way of example only, with reference to the accompanying drawings, in which.

DESCRIPTION OF THE ILLUSTRATED EMBODIMENT(S)

Figure 1:
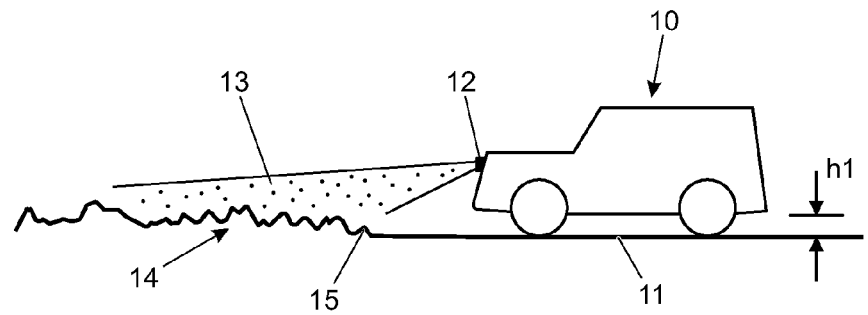
FIGS. 1-3 illustrate a vehicle having adjustable height suspension in relation to passage across an area of rough terrain.

With reference to FIG. 1 a vehicle 10 having off-road capability, in particular ride height adjustment, is illustrated on a smooth highway 11. Ride height is h1. A forward facing time of flight camera 12 illuminates the scene ahead with infra-red light 13. The scene is repeatedly imaged so that the vehicle systems are alerted to a piece of rough terrain 14 ahead of the vehicle.

Figure 2:
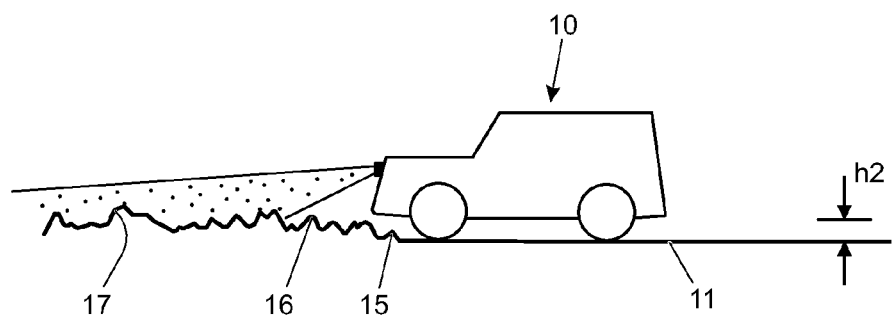

FIG. 2 shows how such an alert results in predictive raising of suspension height from h1 to h2, so that by the time the vehicle reaches rough terrain it is adapted appropriately.

A time of flight camera accurately predicts the position of the vehicle with respect to points of interest ahead of the vehicle, and by comparing successive images the distance traveled by the vehicle can be determined. For example one or more points of interest 15 may be selected for calculating the distance to be traveled to the intent that the vehicle suspension has achieved a pre-determined configuration by the time that the vehicle has reached the point of interest. As illustrated height h2 is reached as the vehicle reaches commencement of the rocky terrain.

Subsequently, additional points of interest 16, 17 are located and monitored to provide for continual determination of terrain type and distance traveled.

Figure 3:
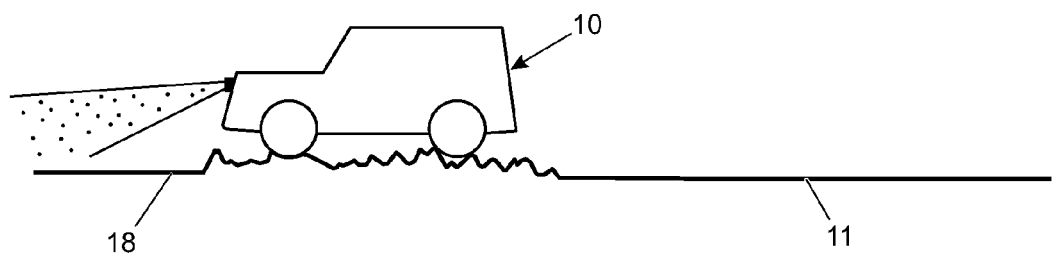

Upon detection of smooth highway at location 18 (FIG. 3) the suspension is commanded to resume a highway setting when the rear wheels are clear of the rocky terrain. In an embodiment the distance to be traveled to the highway may be added to the vehicle wheelbase so that, in this example, suspension height is not reduced until all four wheels of the vehicle are on the highway. This preferred embodiment may be used for all circumstances where a reduction of suspension height is indicated, so as to obviate a suspension setting that is at anytime too low for the terrain beneath the vehicle wheels.

The invention is typically implemented in an electronic control system of a vehicle having a look-up table or like relational database system for relating points of interest to preferred suspension settings. Such settings are commanded by outputs of the electronic control system in sufficient time for the vehicle to adopt a desired setting before reaching rough ground. Commands may be speed related, so that a fast moving vehicle may have enhanced priority or speed of adjustment of suspension settings. The electronic control system may also limit the maximum speed of the vehicle according to the selected suspension settings, so as for example to progressively restrict maximum vehicle speed as the suspension is raised.

The vehicle driver may be permitted to configure the invention, for example to determine a desired suspension setting for a terrain type, or to determine maximum vehicle speed over a terrain type. The configurable settings may lie within limits pre-determined by the vehicle manufacturer.

The electronic control system may be configured to alert the vehicle driver to a change of suspension setting, for example by chime or dashboard display.

It will be appreciated that several suspension settings may be provided appropriate to terrain of increasing roughness, for example five settings may provide a reasonable range of settings for terrain types from smooth highway to very rough off-road.

The ground plane for determining the extent of any deviation may be determined by conventional techniques. In relatively smooth ground, where deviations are infrequent, the smooth ground provides a ground plane reference. On rough ground, suspension travel may be measured so as to allow an average deviation from a ground plane to be determined. A combination of these techniques may be used.

The invention may be used to determine an average surface roughness where deviations appear to be continual and of the same order of magnitude. At any suspension setting, the vehicle may additionally identify significant isolated deviations, and prepare the suspension accordingly if the track of such deviations is toward the vehicle. A significant isolated deviation may be a large pot hole on a rough track, or a rock step.

The invention may be used in conjunction with measuring techniques for vehicle speed and distance so as to determine when a transient large deviation has passed the vehicle. In this way the suspension may be commanded to resume a previous setting automatically.

Figure 4:
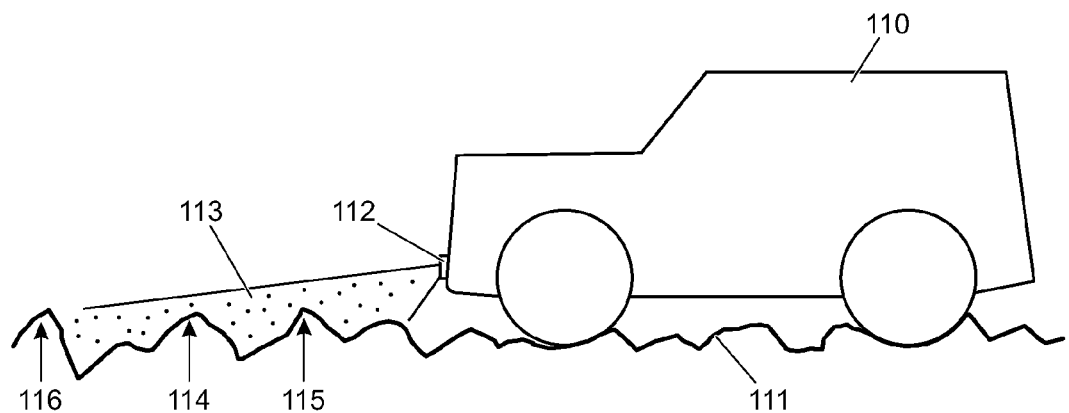
FIG. 4 is a schematic representation of a vehicle off-road and employing the invention.

FIG. 4 represents a vehicle 110 with off-road capability travelling on an uneven rock surface 111, such as a river bed. In such conditions, as is well understood, wheel traction may be poor so that one or more driving wheels of the vehicle slips with respect to the rock surface. The vehicle driver may wish to select a low speed cruise control function, say at 5 kph, in order to maintain progressive forward travel whilst concentrating on steering. Current systems of measuring vehicle speed by counting wheel rotations are inaccurate where repeated wheel slip is encountered, and methods relying on GPS or inertial devices have the disadvantages mentioned earlier.

In the invention a forward facing time of flight camera 112 illuminates the terrain ahead of the vehicle, and generates an image thereof on an imaging chip. Illumination is indicated by the cone of infra red light 113, and it will be appreciated that any forward facing fixed location of the camera may be suitable, for example in a conventional light fitting or at the leading edge of the bonnet.

The chip image repeats at a pre-determined refresh rate, so that the speed of movement of a point of interest 114 with respect to the vehicle can be determined. The points of interest can be any topographical feature having a repeated form in successive images, but techniques for identifying and comparing successive images form no part of the invention.

The point of interest may comprise a number of pixels in an image which represent a topographical feature or may be a line feature, or a group of topographical features having an identifiable spatial relationship.

Several points of interest may be identified simultaneously, and known techniques may be used to use such points to increase confidence in the measured speed.

Time of flight camera systems have a resolution of 5 mm or better. Accordingly the point of interest may for example be a feature on a rock, such as a crack or a depression.

Furthermore several points of interest may be used successively to maintain an indication of vehicle speed as the vehicle advances over the ground. Thus a preceding point of interest 115, and a next point of interest 116 are indicated in FIG. 4. These successive points of interest may be mapped simultaneously to ensure that speed calculation is continual. Vehicle speed may for example be re-calculated at the refresh rate of the image, or may be at a slower rate.

As each image provides a distance to several points of interest within the image, and the refresh rate of the camera is known, the relative speed of each point of interest with respect to the vehicle can be calculated. In embodiments where several points of interest are identified, the mean of these points is taken to represent the speed of the vehicle, though in further embodiments other values such as the median may be used. If the number of points of interest identified in an image is above a predetermined value, such as ten, a distribution of calculated relative speeds is calculated and statistical outliers are ignored, thereby producing a more accurate result.

In particular, the sideways motion of the vehicle relative to the image can be analysed to give a. relative speed across the scene. This sideways motion may be horizontal or vertical with respect to the vehicle. Relative motion in all directions can be computed so as to determine movement in three mutually perpendicular directions of translation and in pitch, roll and yaw. Any combination of these relative motions can then provide a velocity. By calculating a velocity in three dimensions and the pitch, roll and yaw of the vehicle, a vehicle state estimation is provided.

The selected points of interest may be allocated to distance ranges, such that at least a near and far field are identified in order to provide for new points of interest as old points of interest pass beneath the vehicle.

The invention provides a reliable indication of vehicle speed without regard to wheel spin or slip, and this facilitates cruise control at low and very low speed (e.g. less than 5 kph).

Figure 5:
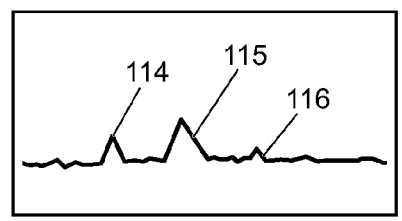
FIGS. 5-7 show schematically successive images from a moving vehicle.
Figure 6:
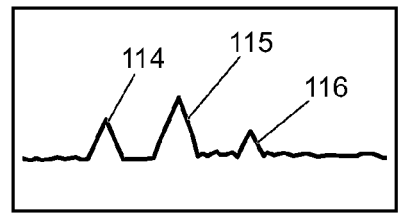
Figure 7:
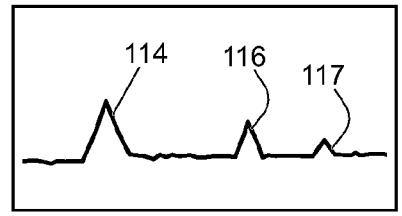

FIGS. 5-7 indicate schematically how large discontinuities may appear in frames spaced by several seconds. For ease of illustration three discontinuities in the near/far continuum are shown. The near and far criteria may be set or adjusted according to circumstances of vehicle use, and may for example have a transition at 5 metres. More than two distance bands may be defined. Also, for ease of illustration a generally flat surface is depicted from which discontinuities project upwardly—depressions may also be used as discontinuities, and the ground surface may not be flat.

The illustrated frames of FIGS. 5-7 are several seconds apart. It will be appreciated that the refresh rate is tens of frames per second, so that much information is available for processing, and image discrimination.

FIG. 5 shows discontinuities 114-116 in the middle, near and far field at time t=0. FIG. 6 shows a representation at time t=5 seconds; the discontinuities are closest to the vehicle, and accordingly larger. The speed of the vehicle can be calculated since it can be assumed that the discontinuities are in a fixed location.

FIG. 7 shows a representation at time t=10 seconds. The largest discontinuity has disappeared under the vehicle, and has been replaced by a new discontinuity 117 in the far field.

The repeated images generated on the imaging chip may be used to generate a topographical plan view of the terrain ahead of the vehicle—a so-called birds-eye view. The passage of the vehicle over such a view can be tracked as the images repeat, and the relative speed with respect to a reference location, or in a reference direction, may be determined. Thus the changing attitude of the vehicle can be accommodated within the invention provided that the point or points of interest remain within the field of view of the camera. Conventional techniques can be used for identification and discrimination of topographical features which change relative position due to change of vehicle attitude. The rapid refresh rate of the system of the invention ameliorates this task.

The invention claimed is:

1. A vehicle suspension control system comprising a vehicle-mounted camera system having a forward facing camera, the system being configured to repeatedly capture an image of the scene ahead of the vehicle, wherein the system is further configured to:
   identify topographical features in the scene;
   identify the speed of the vehicle; and
   automatically adjust suspension parameters of the vehicle in advance of the vehicle travelling over said topographical features by controlling the suspension to assume either a highway setting or one of a plurality of off-road settings different from said highway setting,
   wherein said automatically adjusting suspension parameters comprises selecting an off-road setting from said plurality of off-road settings such that both the nature of said features and an expected speed of the vehicle when it reaches said features are taken into account in combination when selecting the off-road setting.

2. A system according to claim 1, wherein the system is further configured to identify a point of interest in the repeating image and determine the speed of movement of the vehicle with respect to said point of interest.

3. A system according to claim 1, and configured to vary ride height of the vehicle according to the maximum deviation of said features from a ground plane.

4. A system according to claim 1, and configured to vary suspension stiffness according to the maximum deviation of said features from a ground plane.

5. A system according to claim 1, and configured to continually assess a plurality of said topographical features to determine an average surface roughness, and to adjust suspension parameters according to said average.

6. A system according to claim 5, and further configured to identify an isolated and increased deviation from said average surface roughness, to determine whether said increased deviation is in the path of the vehicle, and to temporarily adjust said suspension parameters in advance of the vehicle meeting said increased deviation.

7. A system according to claim 1, and further including an alert for the vehicle driver for each adjustment of suspension parameters.

8. A system according to claim 1, and further configured to restrict maximum vehicle speeds according to the adjustment of said suspension parameters.

9. A system according to claim 8, wherein said maximum vehicle speeds are configurable by the vehicle driver.

10. A system as claimed in claim 1, wherein the camera system is a vehicle-mounted time of flight camera system having the forward facing camera, the system being configured to illuminate and repeatedly capture an image of the scene ahead of the vehicle.

11. A method of adjusting suspension parameters of a vehicle comprising:
    providing a forward facing camera on a vehicle;
    repeatedly capturing an image of the scene ahead of the vehicle;
    identifying topographical features in the repeating image;
    determining the deviation of said features from a ground plane;
    determining the speed of the vehicle; and
    automatically adjusting suspension parameters of the vehicle in advance of the vehicle travelling over said topographical features by controlling the suspension to assume either a highway setting or one of a plurality of off-road settings different from said highway setting,
    wherein said automatically adjusting suspension parameters comprises selecting an off-road setting from said plurality of off-road settings such that both said deviation and an expected speed of the vehicle when it reaches said features are taken into account in combination when selecting the off-road setting.

12. A method according to claim 11, wherein determining the speed of the vehicle comprises:
    identifying a point of interest in the repeating image; and
    determining the speed of the vehicle with respect to said point of interest.

13. A method according to claim 11, wherein said deviations are determined as band of average surface roughness, and said suspension parameters are adjusted according to said band.

14. A method according to claim 11, wherein a deviation is isolated if exceeding a pre-determined size, said method including the steps of determining whether the vehicle will meet the isolated deviation, and adjusting said suspension parameters accordingly.

15. A method according to claim 11, and including the step of raising the suspension of the vehicle in accordance with increasing size of deviation, and lowering suspension of the vehicle in accordance with reducing size of deviation.

16. A method according to claim 11, and including the steps of adjusting suspension damping of the vehicle in accordance with an increasing size of deviation.

17. A method according to claim 11, and including the step of permitting configuration of the suspension settings by the vehicle driver.

18. A method as claimed in claim 11, wherein the camera is a time of flight camera, and the method comprises illuminating of the scene ahead of the vehicle and repeatedly capturing an image thereof.

19. A vehicle suspension control system comprising a vehicle-mounted camera system having a forward facing camera, the system being configured to repeatedly capture an image of the scene ahead of the vehicle, wherein the system is further configured to:
- identify topographical features in the scene;
- identify the speed of the vehicle; and
- automatically adjust suspension parameters of the vehicle in advance of the vehicle travelling over said topographical features by controlling the suspension to assume either a highway setting or one of a plurality of off-road settings different from said highway setting,
- wherein said automatically adjusting suspension parameters comprises selecting an off-road setting from said plurality of off-road settings such that both the nature of said features and an expected speed of the vehicle when it reaches said features are taken into account when selecting the off-road setting, and wherein the system is configured to select a different one of the plurality of off-road settings at a different expected speed.

* * * * *